April 7, 1970  TONG SOO KIM  3,504,571
CONSTANT DIAMETER CAM
Filed Dec. 7, 1967  2 Sheets-Sheet 1
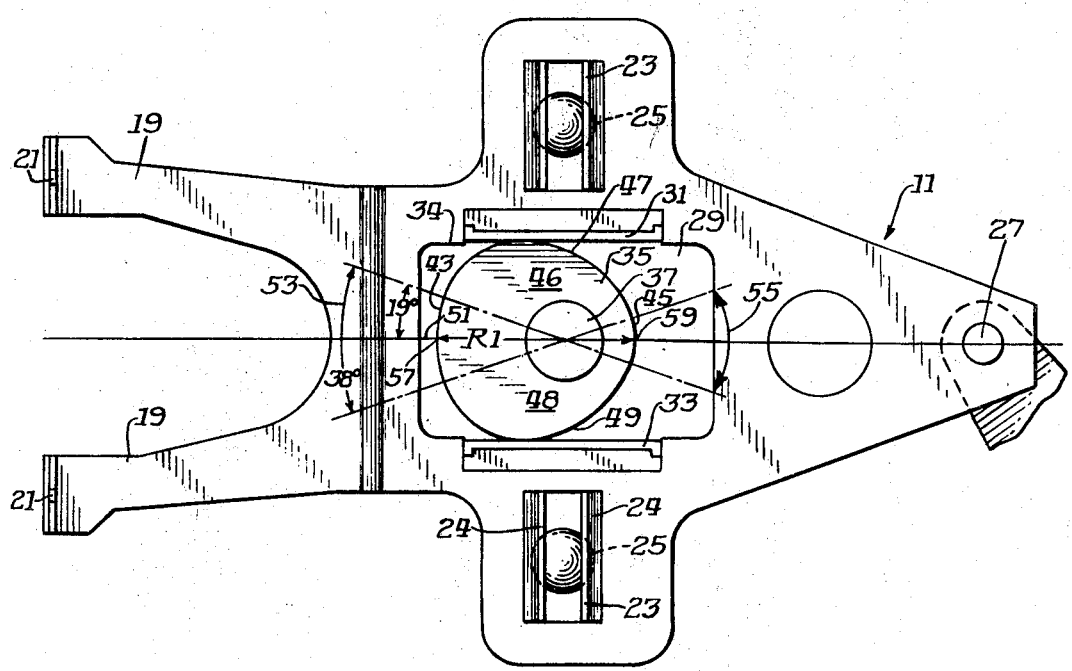
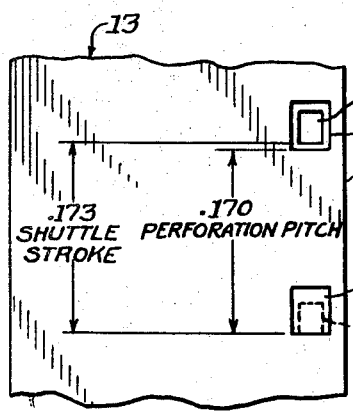
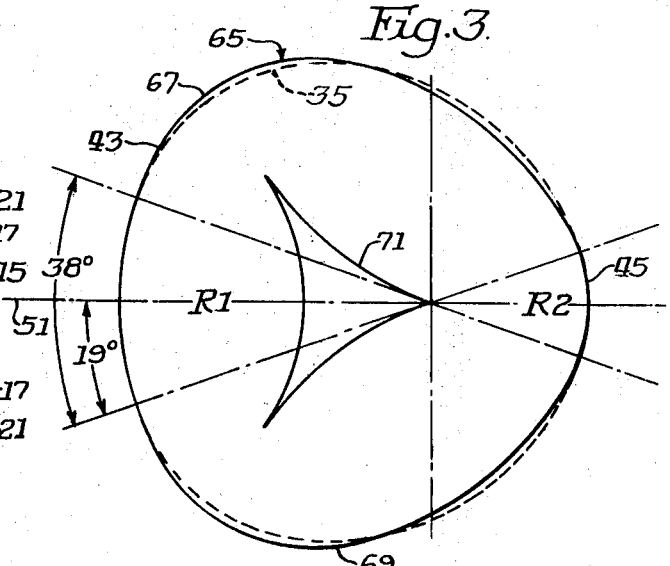
Inventor:
Tong Soo Kim.

April 7, 1970  TONG SOO KIM  3,504,571
CONSTANT DIAMETER CAM
Filed Dec. 7, 1967  2 Sheets-Sheet 2

Inventor:
Tong Soo Kim.
By William F. Pinski
John E. Peele Jr.  Attys

United States Patent Office 3,504,571
Patented Apr. 7, 1970

3,504,571
CONSTANT DIAMETER CAM
Tong Soo Kim, Des Plaines, Ill., assignor to Bell & Howell Company, Chicago, Ill., a corporation of Illinois
Filed Dec. 7, 1967, Ser. No. 688,765
Int. Cl. F16h 53/00
U.S. Cl. 74—567   4 Claims

ABSTRACT OF THE DISCLOSURE

For the drive of a cam driven intermittent in strip feed mechanisms, a novel profile constant width cam rotatable between fixedly spaced followers. The profile minimizes follower acceleration at the initial part of each follower phase and at a point where the direction of acceleration is reversed.

---

The present invention relates generally to cam driven intermittent strip feed mechanisms of the type used in motion picture projectors for successively indexing film frames, although the invention is not limited to such use alone. Particularly, the invention concerns a cam of novel profile adapted for use in a film strip feed or indexing mechanism.

A conventional mechanism of the indicated type may comprise a claw-carrying shuttle arranged for "up and down" or vertical reciprocation. The shuttle is also arranged for "in and out" reciprocation so that the claw means carried thereby will disengage a film strip at the end of each advancing stroke and mesh with perforations in such film strip just prior to an indexing stroke. It is with a rotational cam adapted to impart the vertical reciprocation that the instant invention is concerned.

Hereofore known cams of the indicated class are variously referred to as "heart-shaped," "triangular" or "gravity" cams. They are symmetrical and of "constant width." Such cams are adapted for working rotation between two opposed cam confining followers which are arranged as an assembly in fixed spaced relationship to each other. The prior cams each have a profile defined by a pair of symmetrically disposed throw surfaces comprising circular arcs generated on radii of like lengths. The throw surfaces are disposed between a pair a dwell surfaces, the latter being circular arcs having a common center but radii of different lengths, the difference defining the magnitude of follower displacement.

Ideally, a rotational cam of the described type would maintain continuous engagement with both of its cam followers during cam rotation. Practically however, that continuous condition never obtains because a small gap develops between the cam and each follower, when such follower is in an upstream position relative to the other as the followers are being reciprocated. Accordingly therefore, during cam rotation constantly reversing gaps develop between the follower assembly and the cam. The movement-producing forces responsible for the reversing gap become translated into jerking motion and noise in the reciprocating film indexing system, and likewise, though to a lesser extent in other places where backlashes occur. Such jerking motion and noise are proportionate to shuttle acceleration and, in prior film projectors, reach objectionable, though tolerated, levels. To a follower assembly of the character described, its circular arc cam imparts maximum acceleration at the initiation of each thrust stroke to maximize objectionable effects.

In accordance with the present invention, and as a principal object thereof, there is provided a constant width cam adapted for rotation between a pair of cam confining followers which are reciprocatively arranged in fixed spaced relationship to each other, the profile of said cam being of a character adapted to minimize follower acceleration at the initial part of each follower phase and at a point where the direction of the acceleration is reversed. Thereby, undersirable cam assembly jerking and related noises are minimized as the location of the gap is changed.

It is a further object of the invention to provide a cam having curved throw surfaces, each of which is generated from a varying radius predetermined to control follower acceleration so that, in an intermittent film indexing mechanism of the character described, noise and jerking of cam associated components may be minimized.

Another object of the invention is to provide a cam wherein each cam throw surface is defined by an involute generated by a simple continuous and curved evolute whereby there will be a gradual increase in follower acceleration as the follower assembly changes direction of its acceleration.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

In the drawings:

FIG. 1 is an elevational view of a conventional cam-operated film strip indexing mechanism of a motion picture projector.

FIG. 2 is a view in the nature of schematic representation of a segment of a film strip.

FIG. 3 is an elevational view of a constant width rotatable cam embodying one form of the present invention and showing inscribed in dotted lines a conventional cam of the same width for the purpose of profile comparison.

Figure 4:
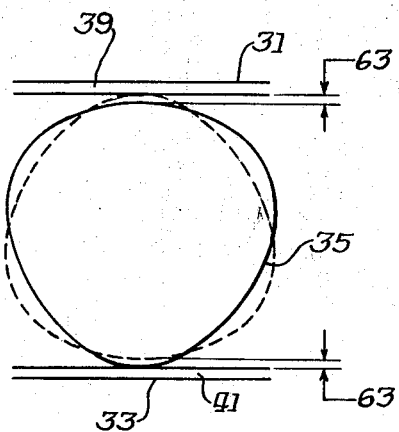
FIG. 4 is a schematic view of a conventional cam and follower assembly showing in exaggerated form a gap normally developed as the cam rotates.

Referring now more particularly to FIG. 1, there is shown a film indexing shuttle generally designated 11 and adapted for a motion picture projector. The particularly illustrated shuttle 11 is adapted for an 8 millimeter projector. A film strip 13, a fragment of which is shown in FIG. 2, comprises a plurality of connected together transparency frames 15 of uniform height. The frames 15 are adapted to be intermittently vertically drawn or fed in a usual manner through a motion picture projector for indexing or registration with its film projection opening to give the illusion of continuity of motion between the images of successive frames.

The film strip has a plurality of customary marginal perforations 17 which are uniformly vertically spaced from each other a distance equal to the height of a frame to facilitate indexing by the shuttle 11. To adapt the film strip for use with said shuttle in an 8 millimeter motion picture projector, the pitch of said apertures 17 is .170 inch. To feed or advance the film strip in a usual manner, a frame at a time, a pair of arms 19 (FIG. 1) comprise shuttle 11. Said arms 19 are disposed in superposed fixed relationship with each other and carry from their outer end portions a pair of customary feed teeth or claws 21. The latter are vertically spaced apart a distance equal to frame height.

To provide for up and down reciprocation of the shuttle, a conventional vertical race 23, comprising a pair of rails 24, may be mounted to confine anti-friction ball bearings 25 relative to which the shuttle 11 is reciprocative in a vertical plane. One of rails 24 is secured to the shuttle, while the other may be secured from a permanent projector part (not shown). However, in addition to vertical reciprocation, the shuttle requires to be rocked for in-and-out claw movement relative to the film strip 13 to engage and disengage claws 21 from the film perforations 17 at the beginning and at the end of each indexing shuttle stroke. To that end, conventional rocking means 27 arranged distal to claws 21 may connect shuttle 11 to a suitable projector part (not shown).

As illustrated in FIG. 1, vertical reciprocation of the shuttle is cam operated. To effect suitable shuttle movement, a medial portion of the shuttle 11 has a cam chamber 29. A pair of horizontal cam follower arms 31 and 33, which are arranged in fixed spaced apart vertical relationship as a positively confining cam follower 34, limits the chamber 29 from above and below.

A conventional cam 35 is rotatably mounted in the cam chamber 29 and is responsible for the upward and downward film indexing reciprocation of the shuttle 11. A driven suitably journalled cam shaft 37 is co-rotational with the cam 35 and defines the axis of rotation thereof. The particularly illustrated shaft 37 is adapted for operation at 3,240 r.p.m.

The cam 35 is operative to reciprocate the shuttle 11 through the medium of a pair of bearing members 39 and 41 (FIG. 4) which are secured from the arms 31 and 33, respectively. For the purpose of illustration, the bearing members 39 and 41 have been disproportionately enlarged. They are disposed between said arms 31 and 33 and said cam for bearing engagement therewith.

The cam 35, like other conventional cams of the same class, is considered as being of constant width. That is to say, cam 35 is adapted to continuously engage the follower bearing members 39 and 41 at a pair of opposed changing points along the cam periphery, the straight line distance between each such pair of engaging points being the same as that for each other pair of such points. Moreover, during each revolution, cam 35 provides throw periods of equal duration, with each throw being followed by a dwell period, the length of which is the same as the length of the other thereof.

To produce the recited periods, cam 35 is defined by a pair of opposite angular dwell segments 53 and 55 which are outwardly limited by a pair of opposite cam profile dwell arcs 43 and 45. Said arcs 43 and 45, together with corresponding angular dwell segments 53 and 55, are generated, respectively, on radii R1 and R2 (FIG. 1) from the center of shaft 37. The difference in radii R1 and R2 is equal to the cam stroke. Disposed between said dwell segments 53 and 55 are a pair of likedimensioned angular throw segments 46 and 48. Segments 46 and 48, respectively, are outwardly limited by a pair of cam profile circular throw arcs or surfaces 47 and 49. The arcuate projections of one pair of adjoining ends of surfaces 47 and 49 intersect opposite ends of dwell arc 43. The opposite pair of adjoining ends of said surfaces 47 and 49 merge with the opposite ends of dwell arc 45 by reason of tangency therewith. The first mentioned adjoining ends of surfaces 47 and 49 are merged into the dwell arc 43 by a pair of small blending arcs, generally of smaller radius than R1 and R2 and not specifically identified in the drawings.

The angular expanse of each of the dwell segments 53 and 55 is about 38° for the illustrated cam 35; and, being symmetrical, each of its throw segments 46 and 48 will have an angular expanse of 142°. However, as it will be appreciated by those knowledgeable in the art, the angular expanses of the various cam segments may be required to vary in accordance with cam use and cam shaft speed. In a film projector, the angular expanses of the cam throw segments are directly proportional to shaft speed while the angular expanses of the dwell surfaces are inversely proportional to shaft speed.

Figure 5:
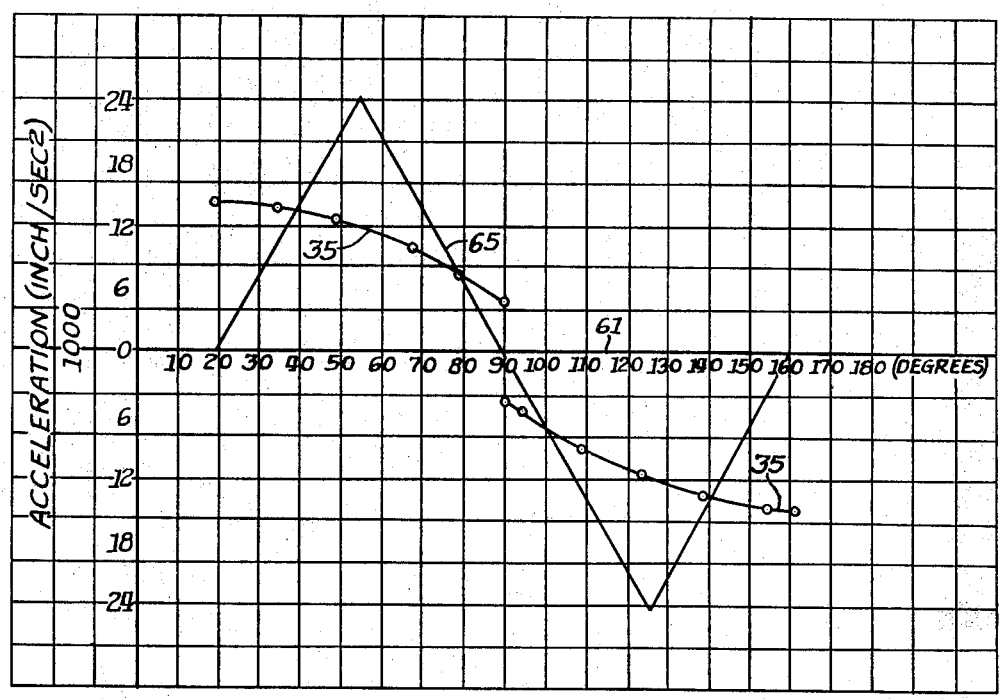
FIG. 5 is a graph comparing the acceleration curves during one phase of a cycle of a follower motivated by a cam conventional profile and a cam having a profile in accordance with the present invention.

To facilitate understanding of FIG. 5, an imaginary bisector 51 (FIG. 1) for opposite angular dwell segments 53 and 55 has been provided. The bisector intersects the profile arcs 43 and 45 at diametrically opposed points 57 and 59. The abscissa line 61 which represents the degrees of angular rotation of the cam 35 has for its zero point a condition in which points 57 and 59 simultaneously engage cam follower arms 31 and 33. The axis line 62 represents acceleration of the cam follower 34. During each complete cam rotation the follower 34 will complete an up and a down stroke. During cam rotation of 180°, from an initial cam condition of 0° in terms of aforesaid reference, the follower 34 will complete either an upstroke or a downstroke depending upon the angular direction of the cam. The line representing data relative to cam 35 is identified in FIG. 5 by the numeral 35.

As the cam 35 rotates from the aforesaid initial position about 19° to an angular disposition just short of that at which the throw surfaces 47 and 49 are adapted first to engage the cam follower arms 31 and 33, the follower acceleration is at zero. Upon continued cam rotation to a condition of first follower throw surface contact, follower acceleration jumps from zero to better than 14,000 inches per second per second. Moreover, at the mid-point of a stroke, the acceleration is suddenly changed by more than 8000 inches per second per second.

Ideally, the cam follower bearing members 39 and 41 remain in continuous contact and simultaneously engage opposite sides of the cam 35 as it rotates. Practically however, that condition does not exist during follower reciprocation when employing the conventional circular arc cam 35. The condition which does prevail is illustrated in FIG. 4. There it is seen that a gap 63 is generated between alternate bearing members 39 and 41 and the adjoining cam throw arc depending on whether the follower 34 is accelerated downward or upward. That is to say, during the first half of downward stroke and the last half of the upward stroke of the follower, gap 63 will develop between the bearing member 39 and the cam 35, as illustrated in the solid line in FIG. 4. On the other hand, during the last half of downward stroke and the first half of the upward stroke of the follower, gap 63 will develop between bearing member 41 and end cam 35 as illustrated in dotted lines in FIG. 4. When the direction of the follower acceleration is reversed at the mid-point of a stroke, the position of the gap 63 shifts and closing of the gap where it has existed will result in an impact between the bearing member and the cam. The impact will be more severe if the change of the direction of the acceleration of the follower is sudden as in the case of cam 35 than if the change is gradual. Moreover, the sudden application and release of acceleration at the beginning and end of a stroke is conducive to a vibration of the follower due to the elastic deformation of the bearing member and/or shuttle frame and the subsequent re-bouncing.

The undesirable characteristics and manifestations of the conventional cam 35 are directly associated with the fact that its throw arcs are circular. As a consequence, there is immediate attainment of maximum acceleration each time a follower stroke is commenced. In accordance with the present invention, these undesirable characteristics and manifestations are substantially minimized, if not practically eliminated, through employment of cam 65 (FIG. 3) in lieu of cam 35 to motivate shuttle 11. In FIG. 5, the graphic characteristics of cam 65 corresponding to the same characteristics of the cam 35 are represented by the line designated 65. By referring to said last figure, it is seen that the acceleration of the follower gradually increases from zero at the initiation of each stroke when it is operated by cam 65.

The aforementioned gap may pre-exist as a result of the unavoidable wear on the bearing member, or it may result from the deformation of the bearing member or the shuttle frame. In the latter case, use of cam 65 will entirely eliminate the problem of impact at the time of the reversal of acceleration since the gap does not exist at the instant. In the former case, the use of cam 65 will minimize the problem of impact because of the gradual change of the acceleration.

Cam 65, like cam 35, is a constant width cam, said cam 65 herein shown being the same width as the cam 35. However, disposed between the dwell arcs 43 and 45 of the cam 65, there is disposed a pair of throw surfaces 67 and 69. The throw surfaces 67 and 69 define a pair of symmetrical involutes or involuted curves which, respectively, serve to blend opposite ends of the dwell arc 43 with the next adjacent ends of the dwell arc 45. As illustrated in FIG. 3, the radius of curvature of each of the throw surfaces 67 and 69 is constantly changing with its center defined by an evolute 71.

It is to be understood that the embodiments shown are illustrative of the principal design of a cam of novel profile for use in a film strip feed mechanism and that certain changes, alterations or modifications can be made in the structure of the device without departing from the spirit and scope of the invention.

What is claimed is:

1. A constant width cam adapted for rotation about a fixed axis for reciprocation of a cam follower having a pair of opposed cam engaging members spaced apart in fixed relationship, said cam having a pair of arcuate dwell surfaces of equal and opposite angular expanse, and a pair of outer curved throw surfaces arranged between and contiguous with said arcuate dwell surfaces and each of said throw surfaces having a center of curvature with a plurality of loci defining a continuously curved closed evolute to provide a cam profile adapted to accelerate the cam follower at a slower rate during the first portion of the throw surface than the later portion thereof and to provide a cam profile adapted for continuous and simultaneous engagement of said cam engageable members.

2. A constant width cam as defined in claim 1 in which the curved throw surfaces are involutes generated from said evolute.

3. A constant width cam as defined in claim 1 in which the curved throw surfaces are each evolute-generated on a radius of curvature of constantly changing length for accelerating said cam follower gradually from and to zero during each rotational cam phase.

4. A constant width cam as defined in claim 1 in which the pair of outer curved throw surfaces are symmetrical non-circular peripheral arcs.

References Cited

UNITED STATES PATENTS

| 1,266,148 | 5/1918 | Otis | 74—567 |
| 1,289,243 | 12/1918 | Otis | 74—567 |
| 1,912,535 | 6/1933 | Mitchell | 74—567 XR |
| 2,029,930 | 2/1936 | Martin | 74—567 XR |
| 2,569,487 | 10/1951 | Mitchell | 74—567 XR |
| 2,741,132 | 4/1956 | Goldberg | 74—567 XR |

OTHER REFERENCES

Rothbart, H. A.: Cams—Design, Dynamics and Accuracy, N.Y., John Wiley and Sons, Inc., 1956, p. 141.

Shaw, F. W.: Dwell Cams of Uniform Diameter, in Mechanical World and Engineering Record, London, 1935, volume 98, pp. 329–330, Oct. 4, 1935.

MARK M. NEWMAN, Primary Examiner

F. D. SHOEMAKER, Assistant Examiner

U.S. Cl. X.R.

352—194